Dec. 1, 1959  A. E. LAYNE  2,915,209
BOAT TRAILER
Filed Oct. 22, 1957  3 Sheets-Sheet 1
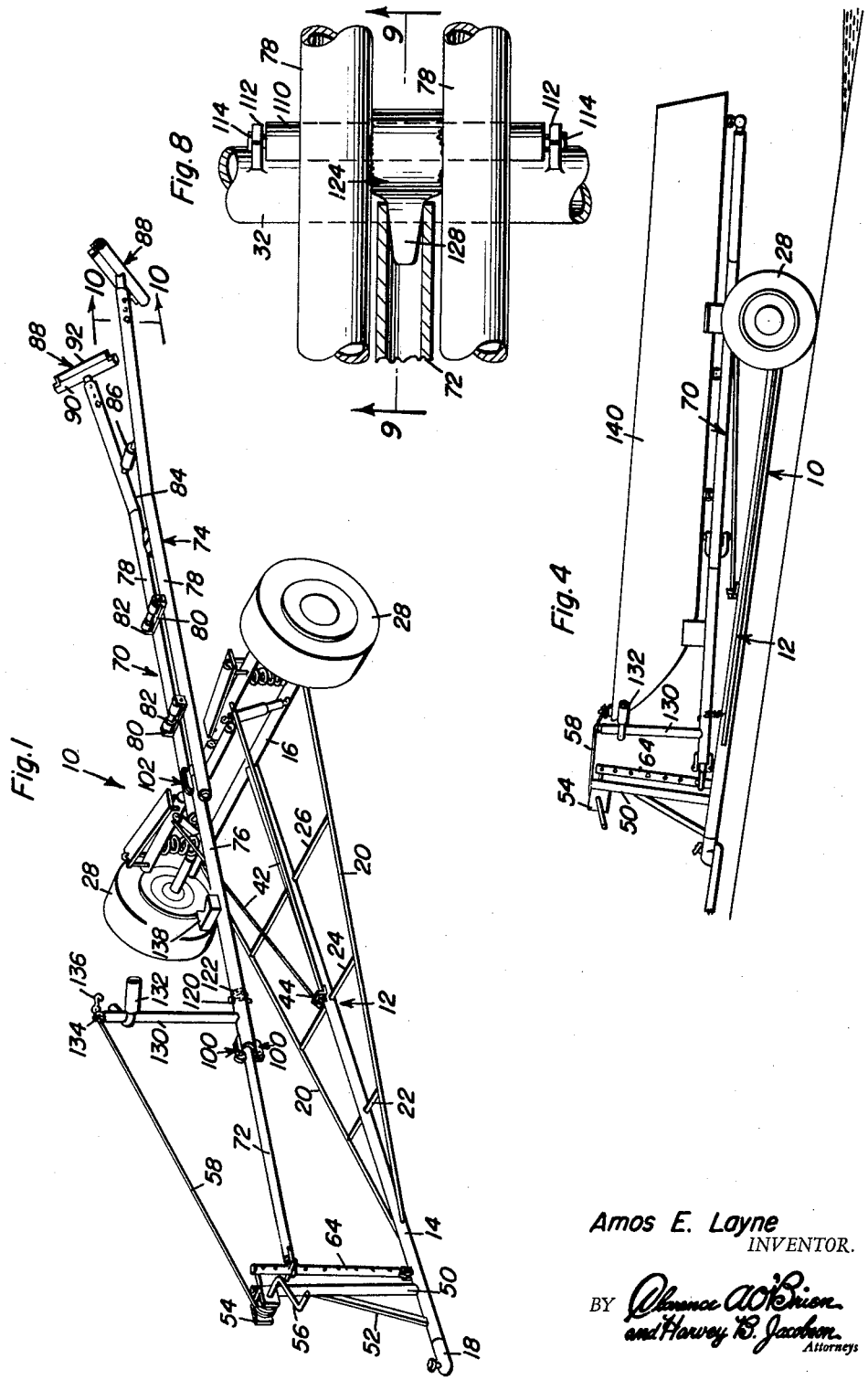
Amos E. Layne
    INVENTOR.
BY Clarence A. O'Brien
and Harvey B. Jacobson
    Attorneys

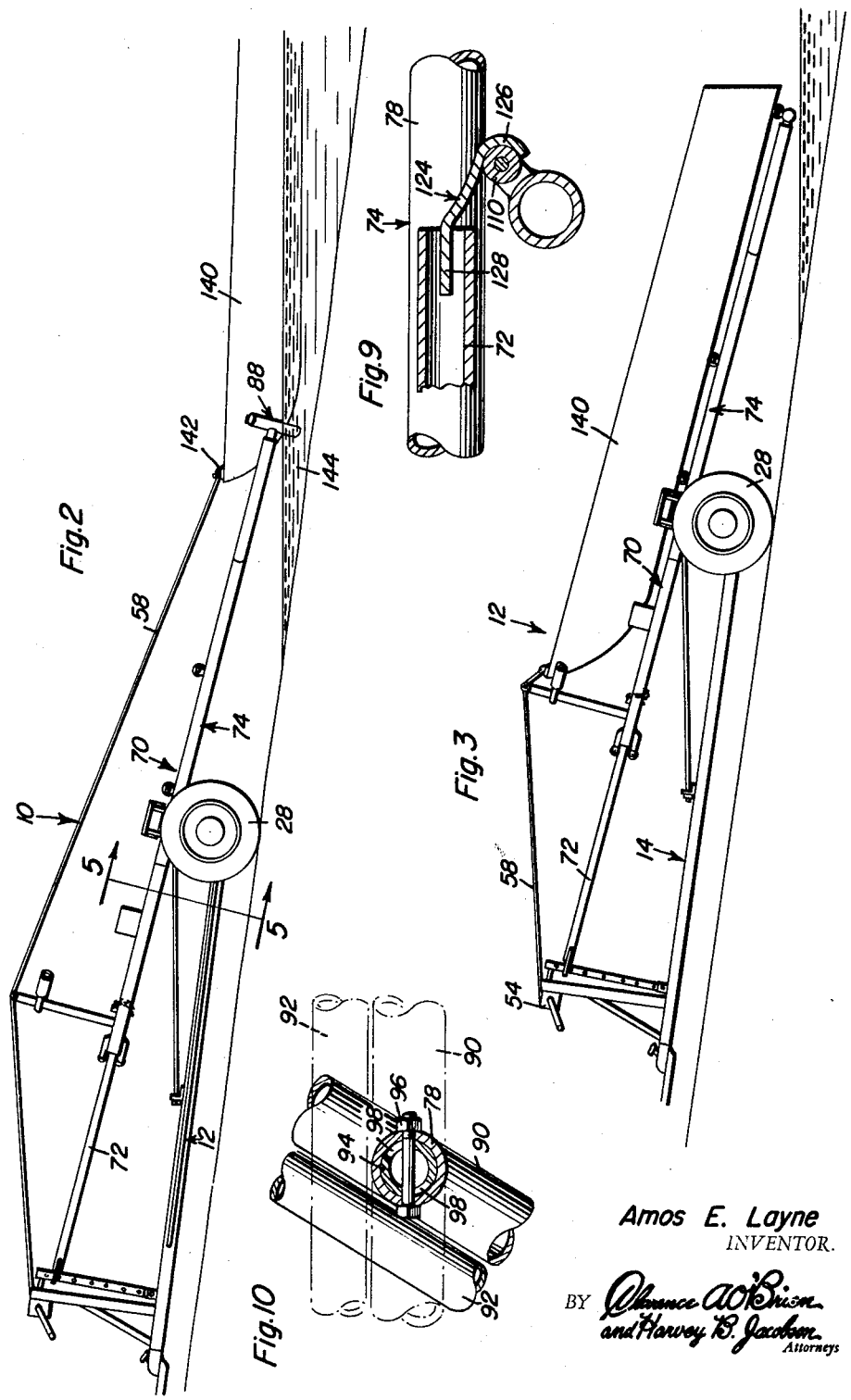

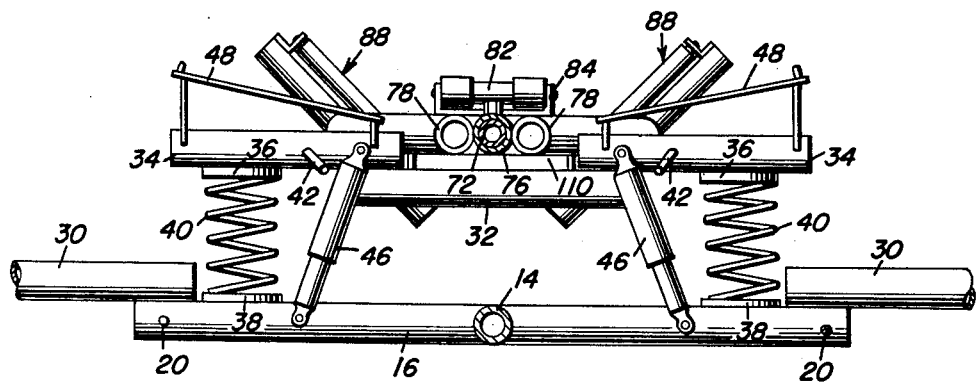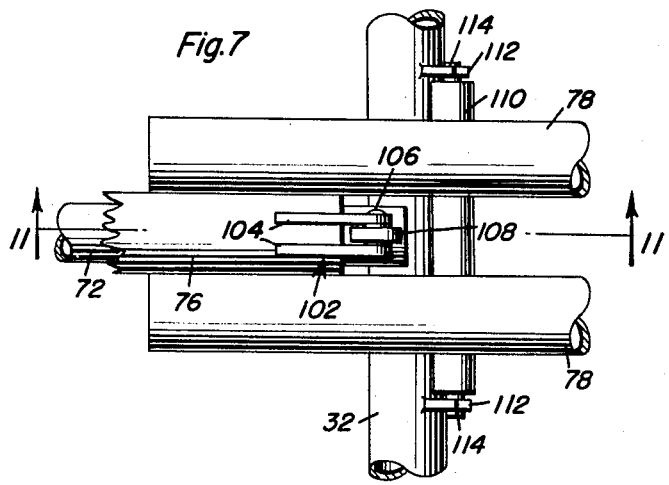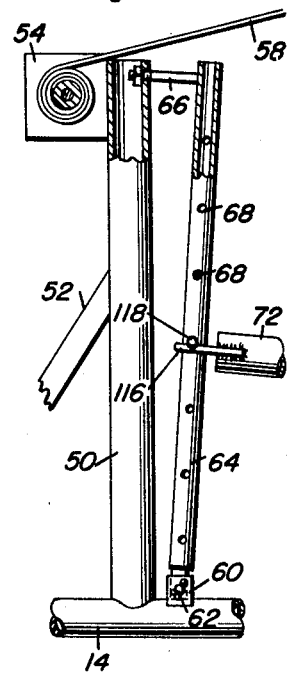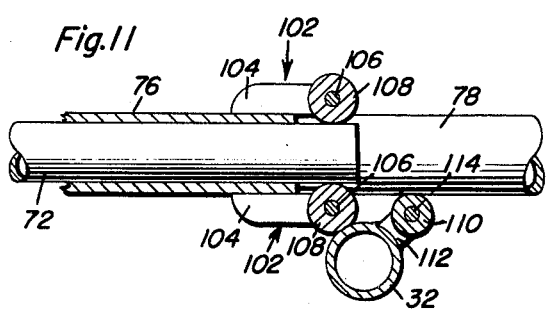

United States Patent Office 2,915,209
Patented Dec. 1, 1959

2,915,209

BOAT TRAILER

Amos E. Layne, Tulsa, Okla.

Application October 22, 1957, Serial No. 691,606

8 Claims. (Cl. 214—506)

This invention relates in general to new and useful improvements in boat trailers, and more specifically to a boat trailer which is so constructed whereby the launching and recovery of a boat is greatly facilitated.

In recent years boating has become one of the nation's major pastimes. Heretobefore boats primarily were of a size whereby they normally remained afloat all year and were removed from the water only through the use of a railway. However, in recent years outboard motors have been developed to the point where they are very dependable. Outboard motors permit lighter boats and smaller boats and as a result, there are now being used many small boats whose owners take them home each time after use. In order to accomplish this, there are provided boat trailers which may be readily towed behind automobiles. In many instances the boats are very light and may be lifted onto the boat trailers. However, a majority of the boats weight too much for one person to launch and retrieve them manually and it is therefore desirable that there be provided a boat trailer which is so constructed whereby a boat may be conveniently launched and retrieved by one person with an expenditure of a minimum of time and effort.

Another object of this invention is to provide an improved boat trailer which is so constructed whereby it is necessary only to back the wheels of the boat trailer to a position immediately adjacent the water edge or slightly in the water after which the trailer may be extended to position the boat in the water and then tilt it so as to launch the boat.

Another object of this invention is to provide an improved boat trailer of the type which includes an extensible boom, the boat trailer including a main frame which has mounted thereon a boom, the boom being formed in sections whereby that portion of the boom supporting the boat may be moved rearwardly with respect to the frame of the trailer so that the boat may be moved into overlying relation with respect to the water, the boom assembly being pivotally mounted on the frame whereby after the boat has been positioned over the water, it may be lowered into the water and thus launched.

A further object of this invention is to provide an improved boat trailer which includes a main frame and a boom assembly, the boom assembly being of the extensible type and being mounted on the main frame for both tilting and extension, the boom assembly being so connected to the main frame whereby when the boom assembly is in a retracted position and there is a boat mounted on the trailer, the boom assembly is rigidly connected with respect to the main frame and stabilized thereby.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view of the boat trailer which is the subject of this invention and shows the boom assembly thereof in both an extended position and a tilted position;

Figure 2 is a side elevational view of the boat trailer in a position for retrieving a boat which is floating in the water;

Figure 3 is a side elevational view of the boat trailer with the boat partially retrieved by the trailer;

Figure 4 is a side elevational view of the boat trailer with the boat entirely retrieved by the trailer and mounted thereon for travel;

Figure 5 is an enlarged transverse sectional view taken substantially upon the plane indicated by the section line 5—5 of Figure 2 and shows the specific cross-section of the trailer in the vicinity of the cross frame unit of the main frame and shows the manner in which the boom assembly is mounted thereon by a spring type support;

Figure 6 is an enlarged fragmentary elevational view of the forward part of the boat trailer and shows the adjustable connection between the forward end of the boom assembly and an upright carried by the frame so as to limit the vertical tilting movement of the boom assembly;

Figure 7 is an enlarged fragmentary plan view of the boom assembly in the vicinity of the transverse support of the frame and shows the relationship between the boom assembly and the transverse support;

Figure 8 is an enlarged fragmentary plan view similar to Figure 7 and shows the boom assembly in its fully retracted position and the relationship of a latch member with respect to the transverse supports;

Figure 9 is an enlarged fragmentary vertical sectional view taken substantially upon the plane indicated by the section line 9—9 of Figure 8 and shows further the details of the latch;

Figure 10 is an enlarged fragmentary sectional view taken substantially upon the plane indicated by the section line 10—10 of Figure 1 and shows the details of the mounting of an adjustable rear roller carried by the boom assembly for engaging a boat as it passes onto the boom assembly; and Figure 11 is an enlarged fragmentary sectional view taken substantially upon the plane indicated by the section line 11—11 of Figure 7 and shows the relationship between a front boom member and a rear boom member which permits the telescoped sliding movement between the two.

Referring now to the drawings in detail, it will be seen that the boat trailer, which is the subject of this invention, is referred to in general by the reference numeral 10. The boat trailer 10 includes a main frame which is referred to in general by the reference numeral 12. The main frame 12 is comprised primarily of a tow pole 14 which extends the full length thereof and which terminates at its rear end in a transverse frame member 16. The forward end of the tow pole 14 is provided with a suitable hitch member 18. The transverse frame member 16 is braced with respect to the tow pole 14 by means of diagonally extending rods 20. The diagonally extending rods 20 are braced at intervals by transverse rods 22, 24 and 26.

In order that the boat trailer 10 may be towed along a road or the like, there are provided ground engaging wheels 28. The ground engaging wheels 28 are carried by stub axles 30 which are secured to the transverse frame member 16 and extend outwardly therefrom in the manner best illustrated in Figure 5.

Carried by the main frame 12 is a transverse support member 32. The transverse support member 32 overlies the transverse frame member 16, but does not extend the full length thereof. Secured to opposite ends of the transverse support member 32 are vertically offset extensions 34. The extensions 34 have secured to the undersides thereof seats 36. The seats 36 are aligned with similar seats 38 carried by the transverse frame member 16. Extending between the seats 36 and 38 are coil springs 40 of the type normally used in the front end suspension of an automobile.

In order to eliminate longitudinal movement of the transverse support member 32, there are secured to the extensions 34 rods 42. The rods 42 extend diagonally from an intermediate part of the tow pole 14 to which they are secured by means of an angle bracket 44, as is best shown in Figure 1. Also, the transverse support member 32 is stabilized by means of a pair of shock absorbers 46 which extend between the transverse frame member 16 and the extensions 34.

Overlying the extensions 34 are upwardly and outwardly sloping plates 48. The purpose of these plates 48 is for engaging the bottom of a boat so that the boat may be rigidly seated with respect to the frame 12.

Referring now to Figures 1 and 6 in particular, it will be seen that the forward end portion of the tow pole 14 is provided with a standard 50. The standard 50 is braced by means of a diagonal brace 52 and has mounted on the upper end thereof a winch 54. The winch 54 may be of any construction and is provided with a handle 56 for operating the same. Reeled on the winch 54 is a line 58 whose purpose will be described in more detail hereinafter.

Also carried by the tow pole 14 immediately rearwardly of the standard 50 is a mounting bracket 60 which carries a transverse pivot pin 62. Pivotally secured to the mounting bracket 60 by means of a pivot pin 62 is an upright 64. The upright 64 slopes slightly rearwardly from the standard 50 and is coupled to the upper end thereof by means of a tie bolt 66. The upright 64 is provided with a plurality of vertically spaced transversely extending apertures 68 whose purpose will be set forth in detail hereinafter.

Referring once again to Figure 1 in particular, it will be seen that the trailer 10 also includes a boom assembly which is referred to in general by the reference numeral 70. The boom assembly 70 includes a forward boom member 72 and a rear boom unit 74. The rear boom unit 74 includes a rear boom member 76 which is telescoped over the forward boom member 72. Incidentally, the forward boom member 72 extends from the upright 64 to a point adjacent the transverse support member 32, as is best shown in Figure 8.

The rear boom member 74 also includes a pair of extension members 78 which are secured to the rear boom members 76 on opposite sides thereof adjacent the rear end thereof and extend rearwardly therefrom. The extension members 78 are connected together at spaced intervals by means of brackets 80 which carry transversely extending rollers 82. Also, rear portions of the extension members 78 diverge as at 84 and the diverging portions are connected together by a roller 86.

In order to initially engage a boat to guide the boat onto the boom assembly 70 and to support the boat in its movement along the boom assembly 70, there is provided a pair of rear roller assemblies 88. Each of the rear roller assemblies 88 includes a support member 90 which has mounted thereon a roller 92. The support member 90 is provided with a mounting member 94 which is telescoped in the rear end of its respective extension member 78. As is best shown in Figure 10, the support 94 is connected to the extension member 78 by means of a bolt 96. However, the support 94 is provided with arcuately extending slots 98 which permits relative rotation of the support 94 within the extension members 78 thus permitting pivoting of the roller unit 88. The roller unit 88 may then follow the contour of the bow and bottom of the boat being mounted on the trailer 10 inasmuch as it may move from the tilted position of Figure 1 to the horizontal position of Figure 10.

In order to facilitate movement of the rear boom member 76 along the forward boom member 72, there is provided at the forward end of the rear boom member 76 upper and lower roller assemblies 100. Similar roller assemblies 102 are provided at the rear end of the rear boom member 76. Inasmuch as the roller assemblies 100 and 102 are identical except for the direction in which they face and their position on the rear boom member 76, only the roller assembly 102 will be described in detail.

Referring now to Figures 7 and 11 in particular, it will be seen that each of the roller assemblies 102 includes a pair of rearwardly extending, transversely spaced straps 104. The straps 104 extend rearwardly beyond the rear boom member 76 in overlying relation to the rear end of the forward boom member 72. Extending between the rear portions of the straps 104 is an axle forming member 106 on which there is mounted a roller 108. The roller 108 engages the forward boom member 72 so as to prevent binding between the rear boom member 76 and the forward boom member 72.

Partially overlying the transverse support member 32 is a transverse support element in the form of a roller 110. The roller 110 is mounted on the transverse support member 32 by means of suitable brackets 112 and a transverse shaft 114. The roller 110 is so positioned whereby it engages the extension members 78 to support the boom assembly 70 and form a transverse horizontal pivot therefor.

As is best shown in Figure 6, the forward end of the forward boom member 72 is provided with a yoke type fitting 116 which is received over the upright 64. Carried by the upright 64 and selectively extending through one of the apertures 68 is a pin 118. The pin 118 overlies the yoke 116 and limits upward movement of the forward boom member 72.

In order that rearward movement of the rear boom unit 74 with respect to the forward boom member 72 may be limited and the rear boom unit 74 may be locked in its rearmost position, there is carried by the rear boom member 76 a locking pin 120. The locking pin 120 extends through aligned apertures in the forward boom member 72 and the rear boom member 76 when in use. Loss of the pin 120 is prevented by means of a chain 122 which is connected both to the pin 120 and the rear boom member 76.

The rear boom unit 74 is locked to the frame 12 when in its forward position by means of a latch member 124 which is best illustrated in Figures 8 and 9. The latch member 124 extends between the extension member 78 and includes a forwardly opening hook portion 126 which is engageable with the roller 110 so as to limit forward movement of the rear boom unit 74 and at the same time to prevent upward movement of the entire boom assembly 70. The latch member 124 is provided at the forward end thereof with a tapered finger portion 128 which is received in the rear end of the forward boom member 72, the finger portion 128 functioning as a stop.

Carried by the forward part of the rear boom member 76 is an upstanding bow engaging member 130. The upper portion of the bow engaging member 130 is provided with a suitably padded bow engaging member 132. The extreme upper end of the bow support 130 is provided with a pulley 134 over which the line 58 passes. The line 58 is provided with a hook 136 which will not pass through the pulley 134. The rear boom member 76 is also provided with a bow engaging block 138 which is disposed rearwardly of the bow support 130.

Referring now to Figure 2 in particular, it will be seen that the trailer 10 is in a position for retrieving a boat 140. At this time the boom assembly 70 is fully extended and tilted downwardly at the desired angle so that the roller assemblies 88 are partially disposed within the water and engageable with the bow of the boat 140.

The line 58 is engaged with a suitable fitting 142 on the bow of the boat 140. After the boat 140 and the trailer 10 have been positioned as is shown in Figure 2, the winch 54 is used to reel in the line 58 and the boat 140 is pulled up onto the rear boom unit 74 to its storage position thereon. This is best shown in Figure 3.

After the boat 140 has been fully seated on the rear boom unit 74, the rear boom unit 74 is then pulled forwardly over the forward boom member 72 by further reeling in on the line 58 using the winch 54. After the rear boom unit 74 reaches its forwardmost position, then due to the overbalance of the boat 140, the boom assembly 70 will tilt downwardly to the position illustrated in Figure 4. At this time the boom assembly 70 may be latched in its lowermost position by properly engaging the pin 118 with the upright 64. The trailer 10 and the boat 140 are now ready to be towed along the highway.

When it is desired to launch the boat 140, the trailer 10 is backed to the approximate position of Figure 2 with respect to the water 144. If it is necessary, however, the wheels 28 may be backed slightly into the water 144. Once the trailer 10 has reached the approximately position of Figure 2 with respect to the water 144, the rear boom unit 74 is moved rearwardly with respect to the frame 12 so that the stern of the boat 140 now overlies the water 144 or is partially submerged therein. Next the forward end of the forward boom member 72 is raised on the upright 64 after the pin 118 has been removed. At this time the stern of the boat is partially floated and the boat may be readily pushed off to the rear boom unit 74 to a completely floating position. If desired, the line 58 may be used to restrain the movement of the boat 140 off of the rear boom unit 74 and to momentarily control the movement of the boat 140 while it is floating free of the trailer 10.

From the foregoing description of the boat trailer 10, it will be readily apparent that there has been devised a relatively simple construction which may be easily manufactured and at the same time the boat trailer 10 is of such a nature whereby one person may readily launch and retrieve a boat. This is highly desirable inasmuch as many times a person desires to go boating by himself or a man takes his wife along and it is undesirable that she has to labor to load and launch the boat.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A boat trailer comprising a frame, said frame including ground engaging wheels, a boat supporting boom assembly carried by said frame, support means supporting said boom assembly on said frame for tilting movement, said frame including a forwardly disposed upright, a fitting on the forward end of said boom assembly engaged with said upright for limiting the tilting of said boom assembly, and latch means locking said boom assembly to said frame, said fitting including a retaining pin carried by said upright, said upright including a plurality of vertically spaced apertures for selectively receiving said retaining pin.

2. A boat trailer comprising a frame, said frame including ground engaging wheels, a boat supporting boom assembly carried by said frame, support means supporting said boom assembly on said frame for tilting movement, said frame including a forwardly disposed upright, said boom assembly including a forward boom member and a rear boom unit, said rear boom unit including a rear boom member telescoped over said forward boom member for sliding movement thereon, a fitting on the forward end of said forward boom member engaged with said upright for limiting the tilting of said boom assembly, and latch means on said rear boom unit locking said boom assembly to said frame.

3. A boat trailer comprising a frame, said frame including ground engaging wheels, a boat supporting boom assembly carried by said frame, support means supporting said boom assembly on said frame for tilting movement, said frame including a forwardly disposed upright, said boom assembly including a forward boom member and a rear boom unit, said rear boom unit including a rear boom member telescoped over said forward boom member for sliding movement thereon, a fitting on the forward end of said forward boom member engaged with said upright for limiting the tilting of said boom assembly, and latch means on said rear boom unit locking said boom assembly to said frame, said latch means engaging the rear end of said forward boom member and functioning as a stop against the forward movement of said rear boom unit.

4. A boat trailer comprising a frame, said frame including ground engaging wheels, a boat supporting boom assembly carried by said frame, support means supporting said boom assembly on said frame for tilting movement, said frame including a forwardly disposed upright, said boom assembly including a forward boom member and a rear boom unit, said rear boom unit including a rear boom member telescoped over said forward boom member for sliding movement thereon, a fitting on the forward end of said forward boom member engaged with said upright for limiting the tilting of said boom assembly, and latch means on said rear boom unit locking said boom assembly to said frame, said support means including a transverse support element, spring type suspension means supporting said support element from said frame.

5. A boat trailer comprising a frame, said frame including ground engaging wheels, a boat supporting boom assembly carried by said frame, support means supporting said boom assembly on said frame for tilting movement, said frame including a forwardly disposed upright, said boom assembly including a forward boom member and a rear boom unit, said rear boom unit including a rear boom member telescoped over said forward boom member for sliding movement thereon, a fitting on the forward end of said forward boom member engaged with said upright for limiting the tilting of said boom assembly, and latch means on said rear boom unit locking said boom assembly to said frame, said support means including a transverse support element, spring type suspension means supporting said support element from said frame, said latch means being in the form of a hook engaging said transverse support element.

6. A boat trailer comprising a frame, said frame including ground engaging wheels, a boat supporting boom assembly carried by said frame, support means supporting said boom assembly on said frame for tilting movement, said frame including a forwardly disposed upright, said boom assembly including a forward boom member and a rear boom unit, said rear boom unit including a rear boom member telescoped over said forward boom member for sliding movement thereon, a fitting on the forward end of said forward boom member engaged with said upright for limiting the tilting of said boom assembly, and latch means on said rear boom unit locking said boom assembly to said frame, said support means including a transverse support element, said transverse support element being in the form of a roller.

7. A boat trailer comprising a frame, said frame including ground engaging wheels, a boat supporting boom assembly carried by said frame, support means supporting said boom assembly on said frame for tilting movement, said frame including a forwardly disposed upright, said boom assembly including a forward boom member and a rear boom unit, said rear boom unit including a rear boom member telescoped over said forward boom member for sliding movement thereon, a fitting on the forward end of said forward boom member engaged with said upright for limiting the tilting of said boom assembly, and latch means on said rear boom unit locking said boom assembly to said frame, said support means including a transverse support element, said transverse support element being in the form of a roller, said latch means being in the form of a hook engaging said transverse support element.

8. A boat trailer comprising a frame, said frame including ground engaging wheels, a boat supporting boom assembly carried by said frame, support means supporting said boom assembly on said frame for tilting movement, said frame including a forwardly disposed upright, said boom assembly including a forward boom member and a rear boom unit, said rear boom unit including a rear boom member telescoped over said forward boom member for sliding movement thereon, a fitting on the forward end of said forward boom member engaged with said upright for limiting the tilting of said boom assembly, and latch means on said rear boom unit locking said boom assembly to said frame, said support means including a transverse support element, spring type suspension means supporting said support element from said frame, said latch means being in the form of a hook engaging said transverse support element, said latch means engaging the rear end of said forward boom member and functioning as a stop against the forward movement of said rear boom unit.

References Cited in the file of this patent

UNITED STATES PATENTS

| | | |
|---|---|---|
| 2,708,045 | Shontz | May 10, 1955 |
| 2,720,413 | Halverson | Oct. 11, 1955 |
| 2,775,357 | DeArment | Dec. 25, 1956 |
| 2,821,315 | Bucher | Jan. 28, 1958 |
| 2,848,126 | Taylor | Aug. 19, 1958 |